March 6, 1951     L. A. LEIFER     2,543,857
COLLET CHUCK

Filed Oct. 25, 1948     5 Sheets-Sheet 1

INVENTOR.
Lorenz A. Leifer
BY
Andrus & Sceales
ATTORNEYS.

March 6, 1951 — L. A. LEIFER — 2,543,857
COLLET CHUCK
Filed Oct. 25, 1948 — 5 Sheets-Sheet 2
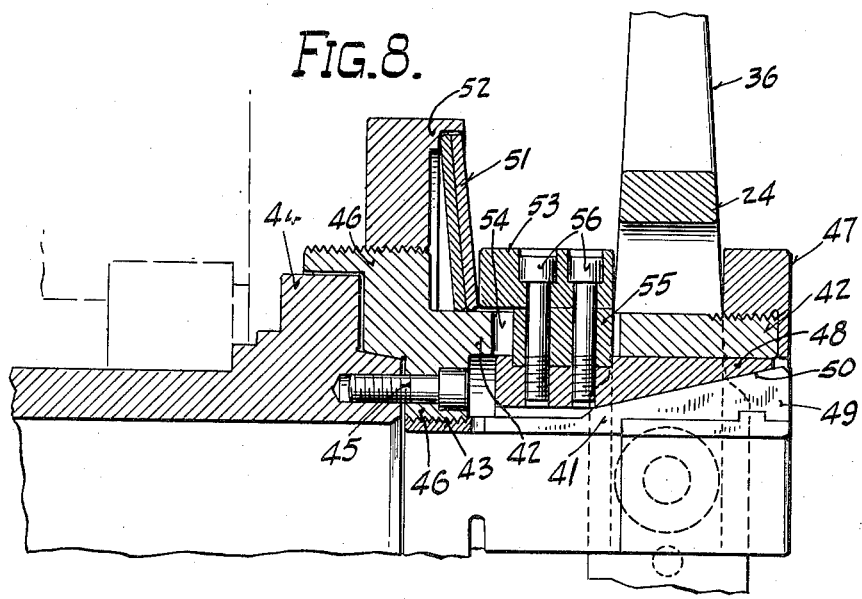
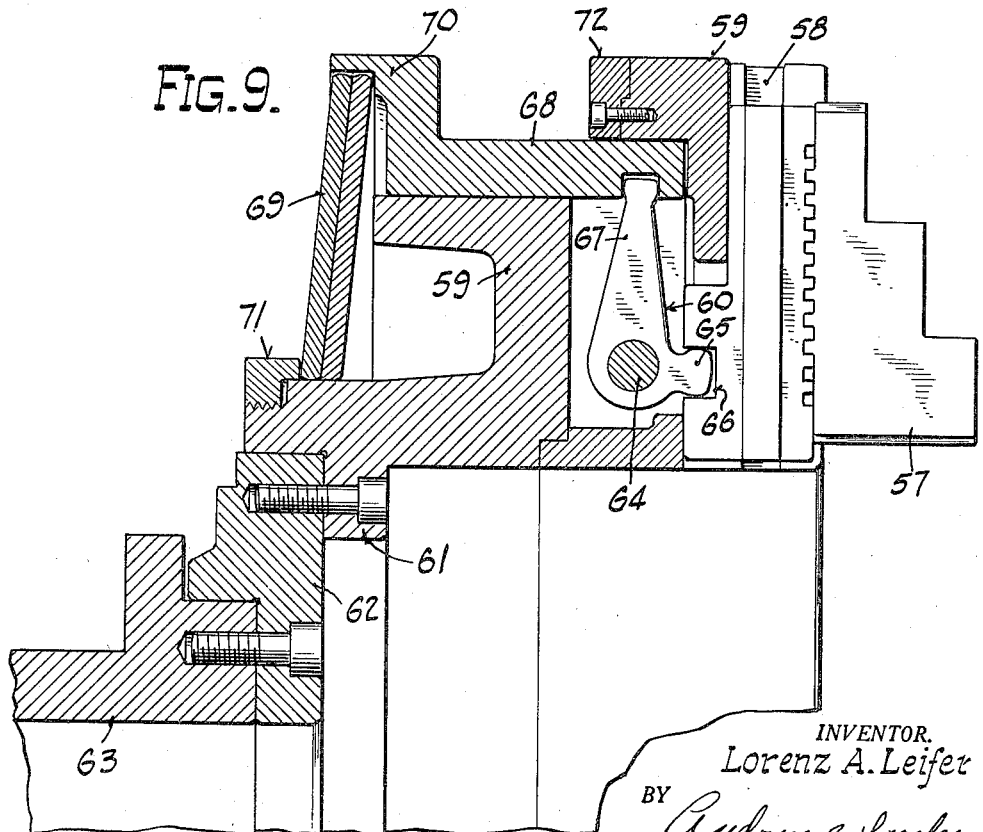
INVENTOR.
Lorenz A. Leifer
BY Andrus & Sceales
ATTORNEYS.

March 6, 1951 L. A. LEIFER 2,543,857
COLLET CHUCK
Filed Oct. 25, 1948 5 Sheets-Sheet 3
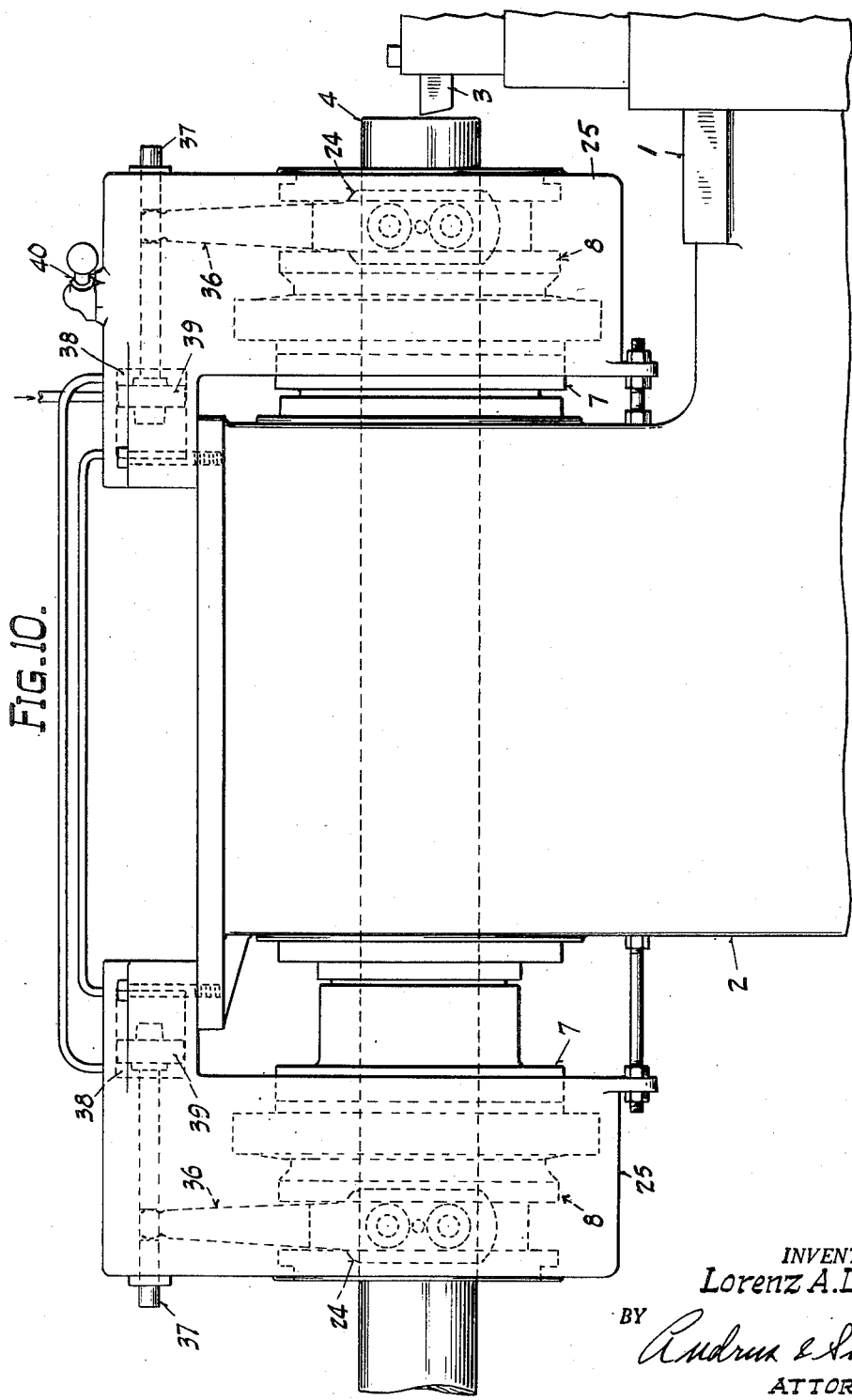
INVENTOR.
Lorenz A. Leifer
BY
Andrus & Sceales
ATTORNEYS.

March 6, 1951  L. A. LEIFER  2,543,857
COLLET CHUCK

Filed Oct. 25, 1948  5 Sheets-Sheet 4

INVENTOR.
Lorenz A. Leifer
BY
Andrus & Scealer
ATTORNEYS.

March 6, 1951    L. A. LEIFER    2,543,857
COLLET CHUCK
Filed Oct. 25, 1948    5 Sheets-Sheet 5
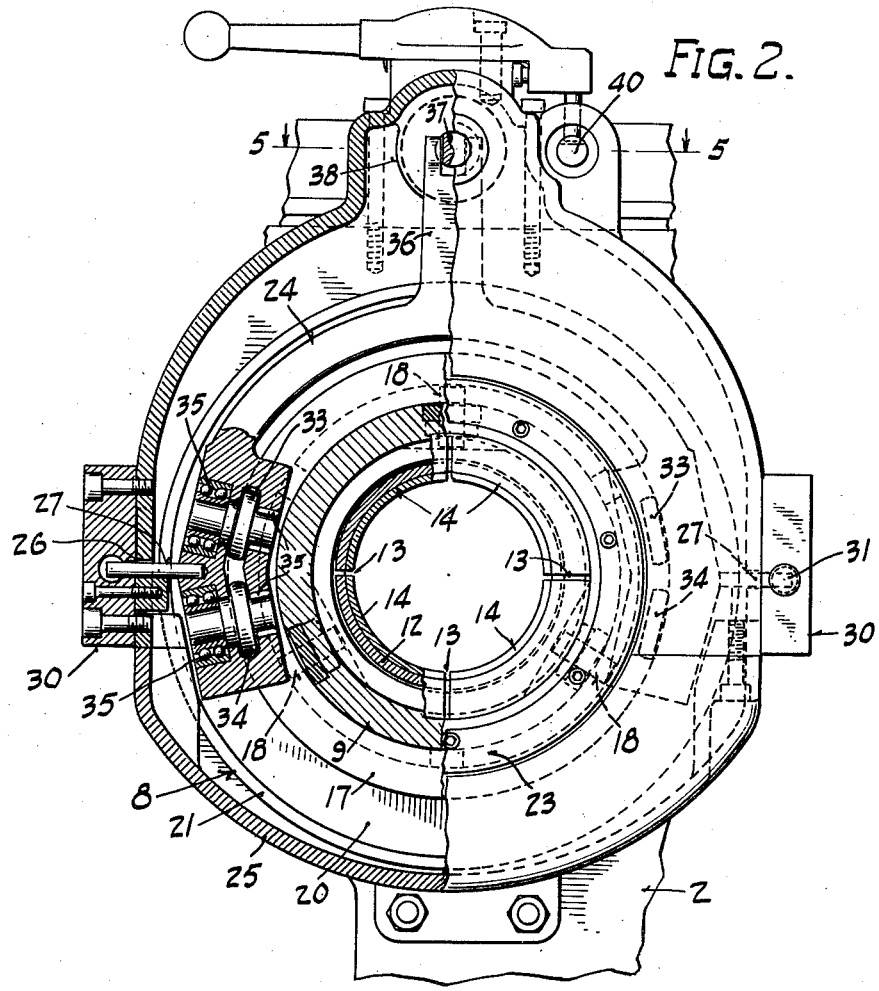
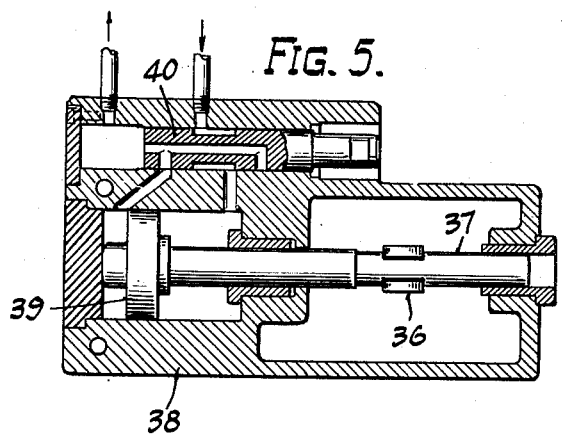
INVENTOR.
Lorenz A. Leifer
BY
ATTORNEYS.

Patented Mar. 6, 1951

2,543,857

UNITED STATES PATENT OFFICE 2,543,857

COLLET CHUCK

Lorenz Albert Leifer, Madison, Wis., assignor to Gisholt Machine Company, Madison, Wis., a corporation of Wisconsin Application October 25, 1948, Serial No. 56,420

21 Claims. (Cl. 279—4)

This invention relates to chucks for lathes and the like and particularly to the operating mechanism for opening and closing the same.

The invention has been applied to both collet chucks and bell crank operated jaw chucks.

One object of the invention is to provide for the chucking of work of wide dimensional tolerances under uniform pressure.

Another object of the invention is to provide for the chucking and unchucking of the work at high rotational speeds with minimum drag upon the spindle, as where it is desired to feed a work blank through the center of a tubular spindle carrying the chuck.

Another object is to eliminate all drag by completely isolating the operating yoke during machining operations upon a chucked workpiece.

Another object is to provide a chuck in which the chucking force is exerted continuously during machining operations upon a chucked workpiece whereby a follow-up of the jaws is provided in the event of deformations or movement of the workpiece.

Another object is to provide a high speed power actuated chuck which has a clear unobstructed central opening for receiving a work blank therethrough that is as large as the inside diameter of the tubular spindle.

Another object is to provide for closing of collet or lever actuated jaws through a comparatively long stroke by spring means carried by and rotatable with the chuck.

Another object is to provide for spring actuation of the chuck under substantially the same load for all working positions of the chuck jaws.

A further object is to reduce the overall dimensions of the chuck for a given capacity.

Another object is to reduce the overhang of externally actuated chuck jaws so that the work is carried as near to the spindle bearings as possible.

Another object is to provide for the equal spring actuation of all the chuck jaws.

Another object is to provide for the easy attachment of the chuck unit to a standard spindle.

Another object is to reduce the time cycle required for chucking and unchucking of the work.

Another object is to provide for the easy assembly and adjustment of the chuck operating mechanism.

Another object is to reduce the axial thrust exerted by the operating mechanism upon the spindle in opening the chuck.

Another object is to reduce the wear upon the chuck operating mechanism when chucking and unchucking at high rotary speeds.

Another object is to provide a double chuck system for handling long work blanks being fed through the spindle.

Another object is to provide an improved collet chuck.

Another object is to provide an improved actuating mechanism for a chuck of the parallel collet type.

Another object is to provide an improved lever operated jaw chuck.

These and other objects and advantages of the invention will be more fully set forth in the following description of a preferred embodiment of the invention illustrated in the accompanying drawings.

In the drawings:

Fig. 2 is a front elevation of the chuck with the cover therefor and other parts of the chuck broken away and sectioned;

Fig. 5 is a horizontal transverse section through the hydraulic operating valve taken on line 5—5 of Fig. 2;

Fig. 8 is a detail axial section illustrating the application of the invention to a parallel closing type of collet chuck;

Fig. 9 is a similar section showing the application of the invention to a lever operated radial jaw chuck; and Fig. 10 is a schematic illustration of a lathe having a chuck at both ends of the spindle.

Figure 1:
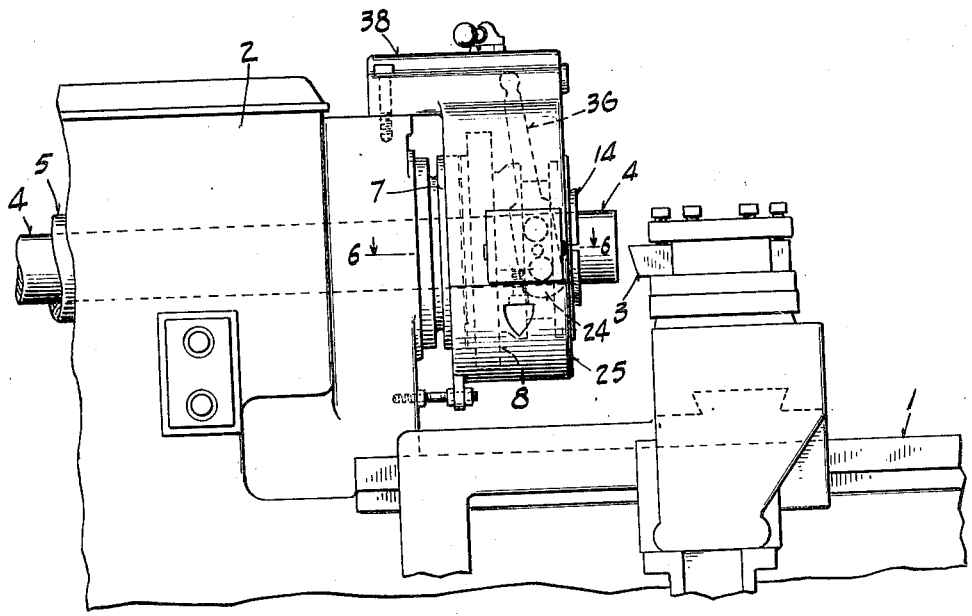
Figure 1 is a side elevation of a part of a lathe showing the chuck mounted on the lathe spindle and with parts thereof broken away and sectioned.

The lathe shown in part in the drawings comprises the bed 1, the headstock 2 at one end of the bed and the tool 3 movably carried on bed 1. The workpiece 4 is rotatably carried on the lathe by spindle 5.

The hollow spindle 5 is rotatably supported within headstock 2 by the bearings 6 at one end, and is rotated by power means (not shown) during the working cycle of the lathe. The circumferential mounting flange 7 on the forward end of spindle 5 carries the chuck 8 for securing workpiece 4 with respect to spindle 5 as will be described hereinafter. Various types of chucks may be mounted on flange 7 and employed in the lathe for various types of work.

The collet chuck 8 shown in Figs. 1 to 7 is particularly adapted for use where the workpiece 4, as shown, comprises a length of round bar stock or tubing from one end of which smaller pieces are cut after being first operated upon by tool 3. In loading the chuck, the workpiece 4 enters spindle 5 at the end opposite flange 7 and is supported within the spindle by the chuck mounted on flange 7.

Means, not shown, may be provided for automatically advancing the workpiece upon the completion of a working cycle of the lathe and the cutting off of the finished piece from workpiece 4.

The chuck 8 securing workpiece 4 for working and releasing the workpiece for advancement within spindle 5 comprises the cylindrical collet hood 9 having a flange 10 for securing to flange 7 of spindle 5, the sleeve 11 carried within collet hood 9 and movable axially therein, and a collet 12 within sleeve 11 and in axial alignment with hollow spindle 5.

The collet 12 comprises a thin walled, hollow cylindrical flexible steel member having a number of longitudinal slots 13 extending from one end a part of its length and providing preferably three or four deflectable jaw members 14.

Collet 12 is threaded within sleeve 11 as at 15 at the inner end of collet hood 9 to move with sleeve 11.

The size of the bar stock 4 required for the finished work determines the size of the collet 12 within the limits of movement of the collet jaw members 14.

The outer surfaces of members 14 at the forward end of the collet are complementary to provide a conical working surface normally in engagement with the corresponding conical inner surface 16 at the forward end of collet hood 9 which deflects members 14 inwardly against workpiece 4 upon movement of collet 12 axially rearwardly and allows members 14 to separate upon movement in the opposite direction.

The chuck operating mechanism comprises the movable ring 17 mounted around the outside of collet hood 9 opposite sleeve 11 and a number of finger levers 18 spaced circumferentially of the chuck and pivotally carried by and extending through collet hood 9 to connect ring 17 and sleeve 11.

Figure 4:
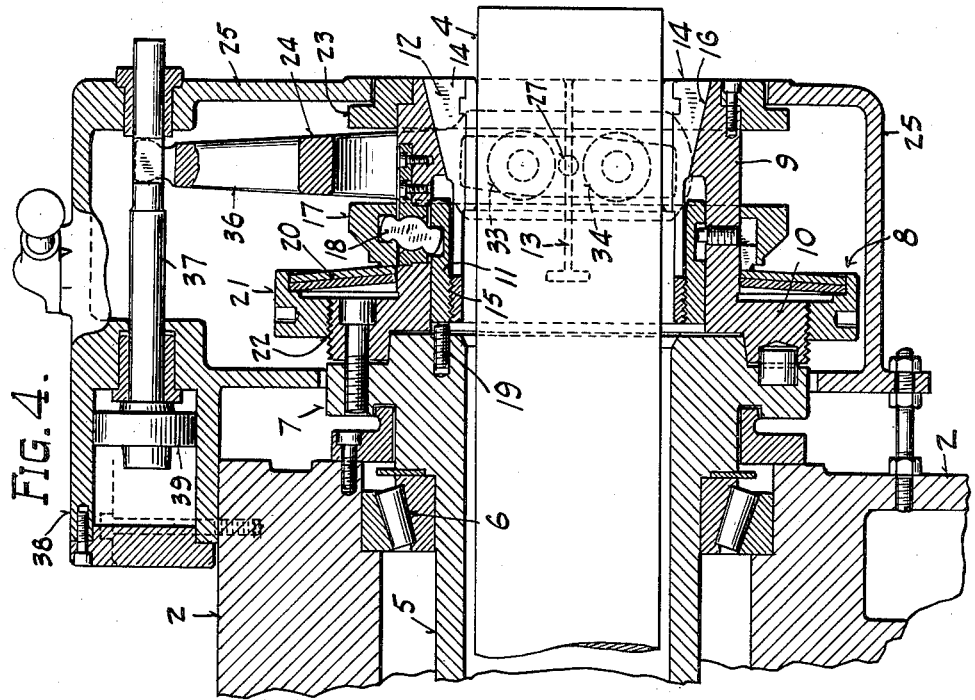
Fig. 4 is a view similar to Fig. 3 showing a workpiece engaged in the chuck.
Figure 3:
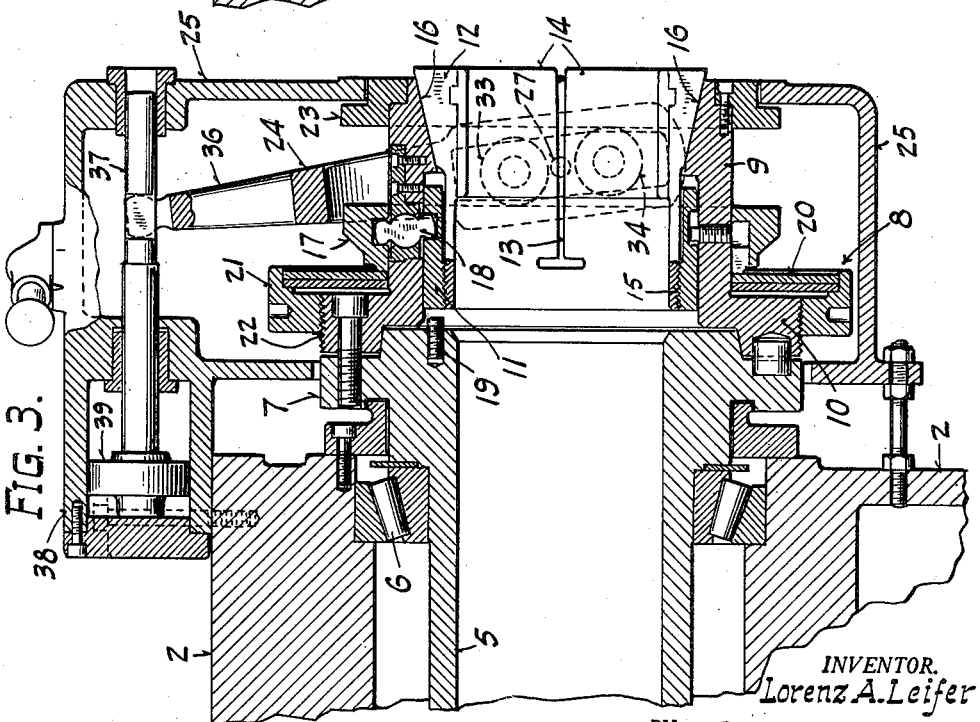
Fig. 3 is a detailed vertical axial section of the chuck showing the same in opened position.

Movement of ring 17 forwardly of the chuck causes the sleeves 11 and collet jaws 14 to be moved through fingers 18 in the opposite direction or rearwardly of the chuck to close the same as shown in Fig. 4. Movement of ring 17 rearwardly opens the chuck as shown in Fig. 3.

The adjustable pin 19 is carried by spindle 5 and projects therefrom to limit the closing movement of collet 12 and prevent overrunning of the finger mechanism.

The actuating means for closing the chuck comprises a number of initially coned disc springs 20 of the Belleville type encircling collet hood 9 and engaging the movable ring 17. The spring retaining member 21 comprising a ring is secured by threads 22 on flange 10 of collet hood 9. The outer periphery of springs 20 is seated against the forward face of ring 21. The inner periphery of springs 20 engages ring 17 to bias the ring forwardly of the chuck and effect the closing of the chuck as described.

The discs 20 should be constructed of a type having a characteristic level force curve for deflections in the operating range employed. This type of Belleville disc is capable of being preloaded up to the working range and to provide in the working range of deflections a substantially constant force for operating the chuck at a predetermined gripping pressure for the jaws. If desired the discs 20 may have the characteristic of providing a slight increase in force as they are deflected toward a flat contour to provide for a slight adjustment of gripping pressures.

Opening of the chuck by moving ring 17 axially rearwardly against the biasing action of the Belleville springs 20 is effected by the operating mechanism of the chuck. The fixed ring 23 is spaced from ring 17 and carried at the forward end of collet hood 9. The yoke 24 extends downwardly on either side of hood 9 between rings 17 and 23 and is supported by the housing 25 enclosing the chuck and secured to headstock 2. The slotted guides 26 in housing 25 on each side and opposite the centerline of the chuck receive the pins 27 which extend horizontally outwardly from yoke 24 and within the respective slots of guides 26. The pins 27 serve to carry the yoke 24 free of the chuck and provide for free pivotal and limited axial movement of the yoke.

Figure 6:
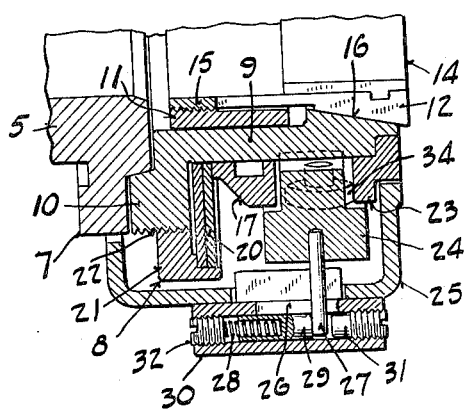
Fig. 6 is a detail section taken on line 6—6 of Fig. 1 showing the supporting pin for the operating lever when the chuck is open.
Figure 7:
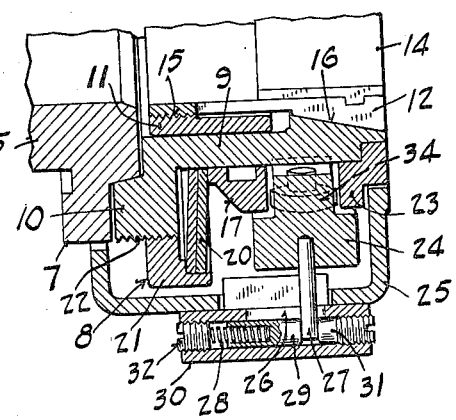
Fig. 7 is a similar view showing the support when the chuck is closed upon a workpiece.

As shown in Figs. 6 and 7 each pin 27 is biased to a normal position where the operating parts of yoke 24 are out of engagement with rings 17 and 23 after chucking of a workpiece. The biasing of the pin 27 is provided by a spring 28 operating a plunger 29 is a slotted tubular casing 30 into which the pin extends at right angles to the casing. A threaded stop 31 extends into the opposite end of casing 30 to adust the position of pin 27 when it is clamped between plunger 29 and the stop 31 as shown in Fig. 7.

During unchucking operations the pin 27 moves against plunger 29 and compresses spring 28 as shown in Fig. 6, so that upon completion of the unchucking-chucking cycle and release of yoke 24, the spring 28 will bias pin 27 back against stop 31 to neutral position. Spring 28 may be adjusted by screw 32 threaded into the end of casing 30 opposite to stop 31.

The upper and lower rollers 33 and 34, respectively, are carried for free rotation by anti-friction bearings 35 in yoke 24 on each side of the chuck. The upper rollers 33 on either side of the yoke are journaled coaxially with the lower rollers 34 on the respective opposite side of the yoke so that their respective axes intersect at the center of rotation of the chuck. Rollers 33 and 34 on each side are disposed equally above and below the center of the chuck.

The upwardly extending arm 36 of yoke 24 is pivotally engaged with the actuating rod 37 which moves longitudinally and parallel to the centerline of the spindle and chuck in housing 25 above the chuck.

Rod 37 may be actuated by any suitable means such as a piston in a hydraulic or air cylinder, or an electric solenoid or a power actuated screw. The actuating means illustrated in a hydraulic cylinder 38 having a piston 39 therein directly connected to rod 37.

The cylinder 38 is connected to the manually operated valve 40 and a source of fluid pressure, not shown, to effect movement of rod 37 under control of valve 40. Any suitable valve means for controlling the actuation of the piston and rod may be conveniently provided to effect automatically the opening and closing of the chuck in the working cycle of the lathe as described above.

In the closed position of the chuck, yoke 24 is disposed approximately vertically, allowing springs 20 to bias ring 17 forwardly toward ring 23 and the collet 12 to be biased rearwardly to hold jaws 14 riding on the tapered surfaces 16 tightly upon the work 4 as shown in Fig. 4.

In the open position shown in Fig. 3 the upper arm 36 of yoke 24 is moved rearwardly by piston 39 causing the yoke to be tilted on pins 27 with respect to the centerline of the chuck. The rollers 34 below pins 27 are moved slightly forwardly to engage the face of ring 23 on the front end of collet hood 9 while upper rollers 33 move rearwardly and engage ring 17. The effective leverage movement of rollers 33 and 34 separates rings 17 and 23 against the biasing action of springs 20 and effects the forward opening movement of collet jaws 14.

The freely supported, self-aligning yoke requires no supporting pivot bearings for pivotal movement. Movement of the yoke against the fixed ring and through the movable ring to depress the springs exerts only a comparatively small axial thrust upon the spindle. The operation of the chuck requires little or no adjustment.

The initially coned Belleville disc springs exert a closing pressure for the collet arms which is substantially constant throughout the capacity of the chuck so that workpieces of varying dimensions or wide tolerances are secured equally tight. The short operating stroke of the springs and of the yoke allow for a chuck of compact design and construction. The springs provide equal thrust on ring 17 on all sides of the spindle so that all collet fingers tend to move alike.

The size and number of springs 20 employed may be conveniently selected according to the chucking requirements of the work. Limited adjustments of the springs may be made by rotating ring 21 forwardly or rearwardly on flange 10.

The operation of the chuck is rapid and the chucking and unchucking operations may be performed while the spindle is rotating at high speed, so that successive machining and cutting operations may be carried out without stopping the spindle.

The chuck is easily installed by securing housing 25 to headstock 2 of the lathe and flange 10 to flange 7 of spindle 5 and making the necessary hydraulic connections.

The embodiment illustrated in Fig. 8 differs from that in Figs. 1 to 7 in employing a parallel closing type collet, thereby eliminating the finger levers 18.

In Fig. 8 the collet 41 is fixed to the body 42 of the chuck by threads 43 at the inner end of the collet. The body 42 is secured to spindle 44 by suitable bolts 45 passing through a flange 46 at the inner end of the body. The collet 41, therefore, is secured against axial movement.

The body 42 is generally cylindrical and carries a flange-like ring 47 threaded upon its outer end and which corresponds to fixed ring 23 of the embodiment of Figs. 1 to 7.

The collet hood consists of a sleeve 48 interposed between the collet 41 and body 42 and which may be moved axially to operate the collet fingers 49 at the outer end by means of the complementary engaging surfaces 50 of the sleeve and collet fingers.

The sleeve 48 and collet fingers 49 are oppositely tapered to dispose the engaging surfaces 50 as a frusto-conical surface having its largest diameter at the outer end so that when the sleeve 48 is moved outwardly it contracts collet fingers 49 upon a workpiece in chucking relation thereto, and when sleeve 48 is moved inwardly it releases the collet fingers 49 and permits them to expand outwardly and release the workpiece.

The sleeve 48 is biased toward chucking position by means of a pair of Belleville springs 51, which correspond to the springs 20 of the embodiment of Figs. 1 to 7. The springs 51 are disposed to have their outer larger diameter edges engage the flange stop 52 which is threaded onto flange 46 of body 42, and to have their inner smaller diameter edges in pushing relation to a movable ring 53 encircling body 42 and which corresponds to movable ring 17 of Figs. 1 to 7.

The ring 53 is secured directly to sleeve 48 through a plurality of circumferentially spaced openings 54 in body 42, by means of radial spacer blocks 55 between the ring and sleeve and bolts 56 securing the ring and sleeve together through the corresponding blocks.

The actuation of movable ring 53 for unchucking and chucking is the same as for ring 17 in the embodiment of Figs. 1 to 7, and need not be described here.

The advantage of the parallel collet type of chuck illustrated lies in the simplicity of construction eliminating the levers 18, and also in the fact that the collet does not move axially in operation. This latter fact enables chucking of a workpiece accurately with respect to its longitudinal position.

The invention may be applied to a lever actuated jaw type of chuck as illustrated in Fig. 9, wherein large diameter workpieces may be chucked.

The chuck illustrated in Fig. 9 is of the multiple jaw type in which the jaws 57 move in and out along radially extending slide ways 58 in the front face of the chuck body 59. Such chucks usually have three jaws.

The body 59 is made up of several annular members secured together and serving to house and support the individual actuating levers 60 for jaws 57. An inwardly extending flange 61 on body 59 is bolted to a plate 62 which is in turn bolted to the end of spindle 63.

Each jaw actuating lever 60 is mounted by means of trunnion bearings 64 in a member of body 59 and has its short arm 65 extending forwardly into a recess 66 in the corresponding jaw 57 to actuate the latter upon pivotal movement of the lever in its bearings.

The long arm 67 of each lever 60 extends radially outwardly to connect with an operating sleeve 68 mounted for axial movement on body 59.

Forward movement of sleeve 68 is designed to effect forward movement of the outer ends of lever arms 67 whereby the arms 65 are pivoted to move the chuck jaws 57 radially inward to chuck a workpiece.

Rearward movement of sleeve 68 is designed to effect rearward movement of the outer ends of lever arms 67 whereby the arms 65 are pivoted to move the chuck jaws 57 radially outward to release a workpiece or to open the chuck for receiving a workpiece.

Sleeve 68 is biased forwardly toward chucking position by means of the large diameter Belleville springs 69 which are mounted at the rear end of chuck body 59.

The outer large diameter edges of springs 69 press against a flange 70 on the sleeve 68 and the inner small diameter edges of springs 69 are confined on a cylindrical section of body 59 by means of an abutment ring 71 threaded onto the rear end of the body. Ring 71 is adjusted in position to give a predetermined pre-loading of springs 69 at the chucking position.

For the purpose of operating the chuck, flange 70 corresponds to the movable ring 17 of the embodiment of Figs. 1 to 7, and a forward fixed member 72 on body 59, encircling the forward end of sleeve 68 constitutes the fixed abutment ring facing movable ring 70 and corresponding to fixed ring 23 of the embodiment of Figs. 1 to 7.

Rings 70 and 72 are spaced axially to receive the chuck actuating lever as illustrated for rings 17 and 23 in the embodiment of Figs. 1 to 7.

The chuck is adapted for application to high speed hollow lathe spindles wherein a continuous work blank is intermittently fed axially through the spindle. In such operation it may be desirable to employ a chuck 8 at each end of the spindle 5 as illustrated in Fig. 10.

In Fig. 10 the chucks 8 are shown as having their power cylinders 38 connected to a common operating valve 40 for simultaneous actuation of the chucks. It is desirable that the hydraulic circuits be constructed to provide a slightly greater time lag for the operation of the chuck 8 at the front end of the spindle than for the operation of the chuck 8 at the rear end of the spindle so that the workpiece is initially chucked and centered under light forces at the rear end prior to final chucking at both ends.

If desired such chucks may be independently controlled by separate valves individually solenoid operated from switches disposed convenient to the operator.

Various embodiments of the invention may be employed in various types of chucks within the scope of the accompanying claims.

I claim:

1. In a rotary chuck of the class described, a plurality of radially movable jaws, a slider ring connected to said jaws to operate the same, a Belleville spring disposed concentric with said ring and biasing the same in a direction to effect movement of the jaws in a direction to grip a workpiece, and means to move said ring against said spring to effect release of the workpiece, said Belleville spring providing substantially equal gripping force over a substantial dimensional tolerance range for the workpiece and constituting a balanced element for high speed rotation of the chuck.

2. In a rotary chuck of the class described, a collet having radially movable fingers to engage and chuck a workpiece, a hood having a tapered surface radially supporting said fingers against working forces, a slider ring disposed to operate said collet by effecting axial movement thereof whereby said tapered surface controls the radial movement of said fingers, a Belleville spring disposed adjacent said slider ring and biasing the same in an axial direction with a uniform force throughout the circumference of the ring effecting chucking of a workpiece by said collet fingers, and means to move said ring against said spring to effect release of the workpiece.

3. In a rotary chuck for high speed lathes and the like, a collet having radially movable fingers to grip a workpiece, a hood having a tapered surface radially supporting said fingers against the workpiece, a slider ring disposed to effect movement of said collet axially whereby said tapered surface controls the radial movement of said fingers, a Belleville spring disposed adjacent said ring and biasing the same axially in a direction to effect closing of said collet fingers radially inwardly to grip a workpiece, and means to move said ring against said spring to effect release of the workpiece, said collet, ring and spring being concentric with the axis of rotation of the chuck to provide a substantially perfect balance for the chuck at all operating speeds.

4. In a rotary chuck of the class described, a plurality of radially movable jaws, a slider ring connected to said jaws to operate the same, a Belleville spring disposed concentric with said ring and biasing the same in a direction to effect movement of the jaws in a direction to grip a workpiece, an axially adjustable support for said spring to provide for a limited adjustment of the chucking forces against the workpiece in accordance with the operating characteristics of the spring, and means to move said ring against said spring to effect release of the workpiece, said Belleville spring providing substantially equal gripping force over a substantial dimensional tolerance range for the workpiece and constituting a balanced element for high speed rotation of the chuck.

5. In a rotary chuck of the class described, a collet having radially movable fingers to engage and chuck a workpiece, a hood having a tapered surface radially supporting said fingers against working forces, a slider ring disposed to operate said collet by effecting axial movement thereof whereby said tapered surface controls the radial movement of said fingers, a Belleville spring disposed adjacent said slider ring and biasing the same in an axial direction with a uniform force throughout the circumference of the ring effecting chucking of a workpiece by said collet fingers, an axially adjustable support for said spring to provide for a limited adjustment of the chucking forces against the workpiece in accordance with the operating characteristics of the spring, and means to move said ring against said spring to effect release of the workpiece.

6. In a rotary chuck for high speed lathes and the like, a collet having radially movable fingers to grip a workpiece, a hood having a tapered surface radially supporting said fingers against the workpiece, a slider ring disposed to effect movement of said collet axially whereby said tapered surface controls the radial movement of said fingers, a Belleville spring disposed adjacent said ring and biasing the same axially in a direction to effect closing of said collet fingers radially inwardly to grip a workpiece, an axially adjustable support for said spring to provide for a limited adjustment of the chucking forces against the workpiece in accordance with the operating characteristics of the spring, and means to move said ring against said spring to effect release of the workpiece, said collet, ring and spring being concentric with the axis of rotation of the chuck to provide a substantially perfect balance for the chuck at all operating speeds.

7. A rotary chuck for lathes, comprising a collet hood adapted to be secured to the end of a rotary lathe spindle, a collet within said hood and having a plurality of circumferentially spaced fingers supported radially by a tapered surface of said hood, a slider ring encircling said hood and disposed for axial movement thereon, means extending through openings in said hood and connecting said ring with said collet to effect axial movement of the latter in response to axial movement of said slider ring, a Belleville spring encircling said hood and disposed between said slider ring and an abutment carried by the hood, said Belleville spring biasing said slider ring in an axial direction effecting operation of said collet to chuck a workpiece, and means disposed to move said slider ring axially against said spring to effect release of the workpiece by the collet.

8. A rotary chuck for lathes, comprising a collet hood adapted to be secured to the end of a rotary lathe spindle, a collet within said hood and having a plurality of circumferentially spaced fingers supported radially by a tapered surface of said hood, a slider ring encircling said hood and disposed for axial movement thereon, means extending through openings in said hood and connecting said ring with said collet to effect axial movement of the latter in response to axial movement of said slider ring, a Belleville spring encircling said hood and disposed between said slider ring and an abutment carried by the hood, said Belleville spring biasing said slider ring in an axial direction effecting operation of said collet to chuck a workpiece, means to adjust the axial position of said abutment on said hood to thereby select the chucking forces exerted by said spring, and means disposed to move said slider ring axially against said spring to effect release of the workpiece by the collet.

9. A rotary chuck for lathes, comprising a collet hood adapted to be secured to the end of a rotary lathe spindle, a collet within said hood and having a plurality of circumferentially spaced fingers supported radially by a tapered surface of said hood, a slider ring encircling said hood and disposed for axial movement thereon, means extending through openings in said hood and connecting said ring with said collet to effect axial movement of the latter in response to axial movement of said slider ring, a Belleville spring encircling said hood and disposed between said slider ring and an abutment carried by the hood, said Belleville spring biasing said slider ring in an axial direction effecting operation of said collet to chuck a workpiece, a fixed ring on said hood spaced axially from said slider ring on the opposite side thereof from said spring, a yoke straddling said hood and having the ends of its arms axially and pivotally floating in the space between said fixed ring and said slider ring, a pair of rollers carried by each yoke arm and spaced circumferentially of the chuck on opposite sides of the floating pivot for the arm whereby tilting of the yoke will effect engagement of one roller on each arm with said fixed ring and movement of the other roller on each arm against said slider ring to thereby move the latter against said spring, and a lever arm secured to said yoke for operating the same to effect release of the chuck.

10. A rotary chuck for lathes, comprising a collet hood adapted to be secured to the end of a rotary lathe spindle, a collet within said hood and having a plurality of circumferentially spaced fingers supported radially by a tapered surface of said hood, a slider ring encircling said hood and disposed for axial movement thereon, means extending through openings in said hood and connecting said ring with said collet to effect axial movement of the latter in response to axial movement of said slider ring, a Belleville spring encircling said hood and disposed between said slider ring and an abutment carried by the hood, said Belleville spring biasing said slider ring in an axial direction effecting operation of said collet to chuck a workpiece, a fixed ring on said hood spaced axially from said slider ring on the opposite side thereof from said spring, a yoke straddling said hood and having the ends of its arms axially and pivotally floating in the space between said fixed ring and said slider ring, a pair of rollers carried by each yoke arm and spaced circumferentially of the chuck on opposite sides of the floating pivot for the arm whereby tilting of the yoke will effect engagement of one roller on each arm with said fixed ring and movement of the other roller on each arm against said slider ring to thereby move the latter against said spring, a lever arm secured to said yoke for operating the same to effect release of the chuck, and a manually controlled power actuator for said lever arm adapted to release the arm when said chuck is closed upon a workpiece to eliminate drag between the arm and chuck.

11. A rotary chuck for lathes, comprising a collet hood adapted to be secured to the end of a rotary lathe spindle, a collet within said hood and having a plurality of circumferentially spaced fingers supported radially by a tapered surface of said hood, a slider ring encircling said hood and disposed for axial movement thereon, means extending through openings in said hood and connecting said ring with said collet to effect axial movement of the latter in response to axial movement of said slider ring, a Belleville spring encircling said hood and disposed between said slider ring and an abutment carried by the hood, said Belleville spring biasing said slider ring in an axial direction effecting operation of said collet to chuck a workpiece, a fixed ring on said hood spaced axially from said slider ring on the opposite side thereof from said spring, a yoke straddling said hood and having the ends of its arms axially and pivotally floating in the space between said fixed ring and said slider ring, a pair of rollers carried by each yoke arm and spaced circumferentially of the chuck on opposite sides of the floating pivot for the arm whereby tilting of the yoke will effect engagement of one roller on each arm with said fixed ring and movement of the other roller on each arm against said slider ring to thereby move the latter against said spring, a power cylinder disposed parallel to said chuck at a substantial distance from the chuck axis, a piston disposed in said cylinder, a source of power fluid, a manually operable valve connecting said source to the opposite ends of said cylinder for operating the piston therein, and a lever arm extending rigidly from said yoke with its outer end connected to said piston to be operated thereby.

12. In a chuck of the class described, a rotary chuck body, a slider ring encircling said body and movable axially for operation of the chuck, a fixed ring on said body spaced from said slider ring, means biasing said slider ring toward said fixed ring, a yoke straddling said body, means supporting said yoke to float axially relative to said body and to pivot on a floating transverse axis passing through said support and normal to the axis of said chuck, a pair of rollers carried by each yoke arm and disposed in the space between said rings with the corresponding yoke support therebetween whereby tilting of the yoke will effect engagement of said fixed ring by one of said rollers and engagement of said slider ring by the other of said rollers to thereby move the slider ring against said biasing means, and means to effect tilting of said yoke.

13. In a chuck of the class described, a rotary chuck body, a slider ring encircling said body and movable axially for operation of the chuck, a fixed ring on said body spaced from said slider ring, means biasing said slider ring toward said fixed ring, a yoke straddling said body, means supporting said yoke to float axially relative to said body and to pivot on a floating transverse axis passing through said support and normal to the axis of said chuck, a pair of rollers carried by each yoke arm and disposed in the space between said rings with the corresponding yoke support therebetween whereby tilting of the yoke will effect engagement of said fixed ring by one of said rollers and engagement of said slider ring by the other of said rollers to thereby move the slider ring against said biasing means, and a lever carried by the yoke and extending radially from said chuck axis to effect tilting of said yoke and separation of said rings with a substantial lever ratio.

14. In a chuck of the class described, a rotary chuck body, a slider ring encircling said body and movable axially for operation of the chuck, a fixed ring on said body spaced from said slider ring, means biasing said slider ring toward said fixed ring, a yoke straddling said body, means supporting said yoke to float axially relative to said body and to pivot on a floating transverse axis passing through said support and normal to the axis of said chuck, a pair of rollers carried by each yoke arm and disposed in the space between said rings with the corresponding yoke support therebetween whereby tilting of the yoke will effect engagement of said fixed ring by one of said rollers and engagement of said slider ring by the other of said rollers to thereby move the slider ring against said biasing means, means to bias said yoke support to a position for said floating transverse axis wherein said rollers are normally held out of engagement with said fixed and slider rings thereby avoiding drag upon the rotation of the chuck when the latter is in chucking position, and means to effect tilting of said yoke.

15. In a chuck of the class described, a rotary chuck body, a slider ring encircling said body and movable axially for operation of the chuck, a fixed ring on said body spaced from said slider ring, means biasing said slider ring toward said fixed ring, a yoke straddling said body, means supporting said yoke to float axially relative to said body and to pivot on a floating transverse axis passing through said support and normal to the axis of said chuck, a pair of rollers carried by each yoke arm and disposed in the space between said rings with the corresponding yoke support therebetween whereby tilting of the yoke will effect engagement of said fixed ring by one of said rollers and engagement of said slider ring by the other of said rollers to thereby move the slider ring against said biasing means, means to bias said yoke support to a position for said floating transverse axis wherein said rollers are normally held out of engagement with said fixed and slider rings thereby avoiding drag upon the rotation of the chuck when the latter is in chucking position, and means to effect tilting of said yoke to engage said rings by said rollers and pry said rings apart in a direction separating the same whereby said slider ring is moved against said biasing means to effect opening of the chuck, said rollers being mounted to turn freely by anti-friction bearings which provide for chucking and unchucking while the chuck is rotating at high speeds.

16. In a chuck of the class described, a rotary chuck body, a plurality of radially movable jaws, a slider ring encircling said body and connected to operate said jaws upon axial movement of the slider, a fixed ring on said body spaced from said slider ring, means biasing said slider ring towards said fixed ring, a yoke straddling said body, means supporting said yoke to float axially relative to said body and to pivot on a floating transverse axis passing through said support and normal to the axis of said chuck, a pair of rollers carried by each yoke arm and disposed in the space between said rings with the corresponding yoke support therebetween whereby tilting of the yoke will effect engagement of said fixed ring by one of said rollers and engagement of said slider ring by the other of said rollers to thereby move the slider ring against said biasing means, and means to effect tilting of said yoke.

17. In a rotary chuck of the class described, a chuck body adapted to be secured to a lathe spindle, a collet secured to said body and having radially movable fingers to engage and chuck a workpiece, an axially movable sleeve encircling said collet and having a tapered generally conical surface radially supporting and operating said collet fingers, a slider ring secured to said sleeve and disposed to operate the same, a Belleville spring disposed adjacent said slider ring between the same and an abutment on said body to bias the slider ring in an axial direction effecting chucking of a workpiece by said collet fingers, and means to move said slider ring against said spring to effect release of the workpiece.

18. In a rotary chuck of the class described, a chuck body adapted to be secured to a lathe spindle, a collet secured to said body and having radially movable fingers to engage and chuck a workpiece, an axially movable sleeve encircling said collet and having a tapered generally conical surface radially supporting and operating said collet fingers, a cylindrical portion of said chuck body encircling and confining said sleeve, a slider ring axially movable upon said cylindrical portion of said chuck body, means rigidly connecting said slider ring to said sleeve through openings in the cylindrical portion of said chuck body, a circumferential abutment at each end of said chuck body spaced from and facing said slider ring, a Belleville spring disposed between one of said abutments and said slider ring to bias the latter in a direction effecting movement of said sleeve to close the collet fingers upon a workpiece, and a chuck operating yoke disposed with bearing parts adapted to engage the other of said abutments and said slider ring to pry the latter axially against said spring to open the collet fingers, said yoke and bearing parts being normally free from engagement with said abutment and slider ring.

19. In a rotary chuck of the class described, a chuck body adapted to be secured to a lathe spindle, a plurality of radially movable jaws mounted on the face of said chuck body, a bell crank lever pivotally mounted in the chuck body behind each jaw and having its shorter lever arm connecting with the corresponding jaw to operate the same, the longer arm of each said bell crank lever extending radially, a slider sleeve disposed to connect with the ends of said long arms of the bell crank levers to operate the same, a Belleville spring carried by the chuck body and disposed to bias said slider in a direction to effect inward chucking movement of said jaws by said bell crank levers, and means to move said slider against said spring to effect radial outward movement of said jaws.

20. In a rotary chuck of the class described, a chuck body adapted to be secured to a lathe spindle, a plurality of radially movable jaws mounted on the face of said chuck body, a bell crank lever pivotally mounted in the chuck body behind each jaw and having its shorter lever arm connecting with the corresponding jaw to operate the same, the longer arm of each said bell crank lever extending radially outward in a recess provided in said chuck body, a slider sleeve riding upon a cylindrical portion of said chuck body to the rear of said bell crank levers and having its forward end overlapping and operatively connected to the outer ends of said bell crank levers, an abutment ring facing forwardly and secured to a rear end portion of said chuck body of substantially smaller diameter than said cylindrical portion, a flange abutment at the rear end of said slider sleeve facing rearwardly and of substantially greater diameter than said sleeve, a Belleville spring confined under preload conditions between said abutments to bias said slider sleeve forwardly to effect inward chucking movement of said jaws by said bell crank levers, an abutment ring carried by said chuck body and encircling the forward end of said slider sleeve in predetermined spaced relation to said flange abutment on said sleeve, and a chuck operating yoke straddling said chuck and having bearing parts disposed between said last named abutment ring and said slider flange abutment and adapted to engage the same to pry said flange abutment axially against said spring and thereby operate said slider sleeve rearwardly to effect radial outward unchucking movement of said jaws by said bell crank levers, said yoke and bearing parts being normally free from engagement with said abutments.

21. In a rotary chuck of the class described, a collet having radially movable fingers to engage and chuck a workpiece, a sleeve encircling said collet and having a tapered generally conical surface radially supporting and operating said collet fingers, an axially movable slider ring connected to cause relative axial movement between said collet and sleeve to operate said collet fingers, a Belleville spring disposed adjacent said slider ring to bias the same in an axial direction effecting chucking of a workpiece by said collet fingers, and means to move said slider ring against said spring to effect release of the workpiece.

LORENZ ALBERT LEIFER.

REFERENCES CITED

The following references are of record in the file of this patent:

UNITED STATES PATENTS

| Number | Name | Date |
| --- | --- | --- |
| 65,790 | Belleville | June 18, 1867 |
| 2,362,146 | Mariotte | Nov. 7, 1944 |
| 2,387,266 | Holland | Oct. 23, 1945 |
| 2,397,159 | Schneider | Mar. 26, 1946 |
| 2,410,344 | Hines | Oct. 29, 1946 |
| 2,466,651 | Zagar | Apr. 5, 1949 |

FOREIGN PATENTS

| Number | Country | Date |
| --- | --- | --- |
| 221,455 | Great Britain | Spet. 11, 1944 |